United States Patent [19]

Lyakhevich et al.

[11] 4,353,752

[45] Oct. 12, 1982

[54] METHOD OF MAKING A SUSPENSION OF A FILLER FOR RUBBER MIXTURES

[76] Inventors: Genrickh D. Lyakhevich, ulitsa Matusevicha, 3, kv. 146; Alexandr E. Sokolovsky, ulitsa Olshevskogo, 33, korpus 1, kv. 67, both of Minsk, U.S.S.R.

[21] Appl. No.: 223,076

[22] Filed: Jan. 7, 1981

[51] Int. Cl.$^3$ .......................... C09C 1/26; C09C 1/04; C09C 1/58

[52] U.S. Cl. .................................... 106/309; 106/307; 106/296

[58] Field of Search ....................... 106/307, 309, 296

[56] References Cited

U.S. PATENT DOCUMENTS

| | | | |
|---|---|---|---|
| 3,203,922 | 8/1965 | Hanmer | 106/307 X |
| 3,917,806 | 11/1975 | Amagi et al. | 106/307 X |
| 4,038,100 | 7/1977 | Haberman | 106/307 |
| 4,155,772 | 5/1979 | Birchall et al. | 106/307 |

*Primary Examiner*—Carl F. Dees
*Attorney, Agent, or Firm*—Ladas & Parry

[57] ABSTRACT

The method comprises mixing polymeric materials containing a filler with a hydrocarbonaceous solvent in a ratio of from 1:0.5 to 1:60 parts by mass.

The above mixture is isothermally heated to provide for a thermal decomposition of the polymeric materials and for a thermal decomposition of the polymeric materials and for a formation of a suspension.

Low-boiling fractions are distilled from the formed suspension in the presence of an inert gaseous agent at a temperature of 50° to 400° C. and at a pressure of $1 \cdot 10^2$ to $1 \cdot 10^5$ n/m$^2$.

5 Claims, No Drawings

4,353,752

METHOD OF MAKING A SUSPENSION OF A FILLER FOR RUBBER MIXTURES

BACKGROUND OF THE INVENTION

1. Field of the Invention

The present invention relates to chemical production procedures and more particularly to methods of making a suspension of a filler for rubber mixtures. The invention may prove most advantageous in the production of products from filled rubbers and other elastomers.

2. Description of the Prior Art

Known in the art is a method of making a disperse filler for rubber mixtures as described in U.S. Pat. No. 3,966,487. The method comprises the steps of pyrolyzing the waste products of polymeric materials at a temperature of from 425° to 1,370° C. for carbonization thereof and grinding the carbonized mass. As a result, carbon black is obtained which can be used as a filler for the production of tires and othe rubber products.

It is to be noted that in the course of the pyrolysis the valuable hydrocarbons contained in the waste products being treated are irreparably lost. In addition, the finely divided carbon black (essentially powder) requires prolonged stirring and homogenization when introduced in a dry state into the rubber mixtures being produced.

More preferable in the production of filled rubbers is the use of a suspension of a filler in a solvent. In particular, known in the art is a method of making a suspension of a filler by dispersing carbon black in a mixture of mineral oil and liquid hydrocarbon, and then introducing divinyl styrene rubber in liquid hydrocarbon (see USSR Inventor's Certificate No. 401,685).

It is simpler to introduce thus obtained suspension of a filler into the rubber mixtures being produced. However, the use of the scarce raw material makes the production process more expensive. In addition, toluene used in this process as a solvent is a toxic and dangerously explosive raw material. The attempts to make the above production procedure less expensive by using cheaper solvents were without success because of a substantial decrease in the quality of the end product.

The object of the present invention is to provide a method of making a suspension of a filler wherein the raw material and the parameters of the production procedure are selected so as to make it possible to do without scarce and costly materials and at the same time to upgrade the quality of the end product.

SUMMARY OF THE INVENTION

The principal object of the present invention is to provide a cheaper and more economical method of making a suspension of a filler.

One more important object of the present invention is to preclude the use of scarce and dangerously explosive materials in the production of a suspension of a filler.

Another object of the present invention is to improve the properties of the end product.

Still another object of the present invention is to improve the operating conditions when making a suspension of a filler.

An additional object of the present invention is to upgrade physico-technical, mechanical and operating characteristics of filled rubbers.

These and other objects of the present invention are attained in a method of making a suspension of a filler for rubber mixtures in a solvent, wherein, according to the invention, polymeric materials containing a filler are mixed with a hydrocarbonaceous solvent in a ratio of 1:0.5 to 1:60 parts by mass, the obtained mixture is isothermally heated to provide for a thermal decomposition of the polymeric materials, and low-boiling fractions are distilled from the formed suspension in the presence of an inert gaseous agent at a temperature of 50° to 400° C. and at a pressure of $1 \cdot 10^2$ to $1 \cdot 10^5$ N/m².

The properties of thus obtained suspension are much better than similar properties of the suspensions obtained by conventional methods. This makes it possible to greatly improve physico-mechanical and operating characteristics of the filled rubbers. Besides, the above conditions of the production procedure make it possible to do without the use of costly and scarce raw materials.

An important advantage of the method of the present invention consists in that, in addition to making a suspension of a filler, this method makes it possible to separate and to utilize a number of other valuable products and can be carried out essentially without wastes. In particular, as a result of distillation there may be obtained liquid fuels, organic softeners and other valuable products.

The best properties of the end product at a minimum production cost are attained in an alternative embodiment of the invention, wherein used as the hydrocarbonaceous solvent are petroleum fractions having a boiling temperature of 25° to 600° C., or a petroleum residue having a softening temperature by the ring and ball method of 5° to 150° C., or low-boiling fractions obtained as a result of the distillation from the products of the thermal decomposition, or a mixture of said petroleum fractions and the suspension of the filler, or a mixture of said low-boiling fractions and the suspension of a filler.

From the economical point of view it is advisable that in the distillation process there be used steam, nitrogen, carbon dioxide and/or mixtures thereof as inert gaseous agents.

To assure the removal of impurities adversely affecting the quality of the suspension, it is expedient that in the distillation process the inert gaseous agent be continuously fed at a rate of from 0.01 to 8 l/hr per 1 kg of the suspension.

DETAILED DESCRIPTION OF THE INVENTION

A method of making a suspension of a filler for rubber mixtures is carried out in the following way. Polymeric materials containing a filler were mixed with a hydrocarbonaceous solvent in a ratio of 1:0.5 to 1:60 parts by mass. Used as the polymeric materials containing a filler are waste products of vulcanized, unvulcanized, and prevulcanized rubber materials based on butadiene-styrene rubber, butadiene rubber, isoprene, rubber, butadiene-nitrile rubber, natural rubber and other rubbers. Used as the hydrocarbonaceous solvent may be petroleum fractions having a boiling temperature of 25° to 600° C., such as 25° to 200° C., 200° to 350° C., 350° to 450° C., 450° to 600° C., or petroleum residues having a softening temperature according to the ring and ball method of 5° to 150° C., as well as low-boiling fractions obtained as a result of a distillation process from the products of a thermal decomposition in the course of carrying out the method of the present invention. Also, used as the hydrocarbonaceous may be a mixture of said petroleum fractions with a suspension of a filler, obtained in accordance with this method, or a mixture of said low-boiling fractions with a suspension of a filler.

Then the obtained mixture is isothermally heated to provide for a thermal decomposition of the polymeric materials and for a formation of a suspension. The heating is carried out at a temperature of 250° to 370° C. and at a pressure of $2\cdot10^3$ to $12\cdot10^5$ N/m$^2$ during 0.5 to 6 hours.

Low-boiling fractions are distilled from the obtained suspension in the presence of an inert gaseous agent. The distillation process is carried out at a temperature of 50° to 400° C. and at a pressure of $1\cdot10^2$ to $1\cdot10^5$ N/m$^2$.

Used as the inert gaseous agent in the distillation process may be steam, nitrogen, carbon dioxide, stack gases, and the mixtures thereof.

The term "stack gases" is used herein to denote a mixture of carbon dioxide and nitrogen, formed as a result of combustion of such hydrocarbonaceous fuels as natural gas, methane, propane, butane, and others.

In the course of the distillation process, the inert gaseous agent is continuously fed at a rate of from 0.01 to 8 l/hr per 1 kg of the suspension.

Now the invention will be described by way of specific Examples thereof.

EXAMPLE 1

According to the invention, 1 part by mass of polymeric materials containing a filler (in this instance, vulcanized waste products of rubber based on butadiene-styrene rubber) was mixed with 5 parts by mass of a hydrocarbonaceous solvent. The hydrocarbonaceous solvent in this case was a petroleum fraction having a boiling temperature of 200° to 350° C. and having the following physical and chemical properties:
 density at a temperature of 20° C., g/cm$^3$—0.9650
 kinematic viscosity at a temperature of 100° C., cSt—37
 sulphur content, parts by mass—2.1
 group chemical composition, parts by mass:
  paraffino-naphtenic hydrocarbons—11.2
  monocyclic aromatic hydrocarbons—20.1
  bicyclic aromatic hydrocarbons—26.4
  polycyclic aromatic hydrocarbons—41.8
  resins—0.8

The obtained mixture was isothermally heated at a temperature of 250° C. and at a pressure of $5\cdot10^5$ N/m$^2$ for 6 hours to provide for a thermal decomposition of the polymeric materials and for a formation of a suspension. Low-boiling fractions were distilled from the formed suspension in the presence of nitrogen. The distillation was carried out at a temperature of 160° C. and at a pressure of $1\cdot10^2$ N/m$^2$, nitrogen being continuously fed at a rate of 0.01 l/hr per 1 kg of the suspension.

The obtained suspension of a filler for rubber mixtures was of the following physical and chemical properties:
 density at a temperature of 20° C., g/cm$^3$—1.4241
 Engler viscosity at a temperature of 100° C., Engler grades—112.4
 content in % by mass:
  of carbon black—54.8
  of hydrocarbons—33.0
  of zinc oxide—4.2
  of active substances—3.2
  of stearic acid—2.7
  of sulphur and its compounds—2.1

The characteristics of the carbon black were the following:
 arithmetical mean diameter of particles, nm—32
 specific adsorption surface, m$^2$/hr—140
 oil number, ml/100 kg—81
 bulk density, kg/m$^3$—330
 density, kg/m$^3$—1,800
 pH of water suspension—4.1

At the same time, a suspension of a filler for rubber mixtures was made in accordance with the production procedure most closely related to the method of the present invention. The cost of the end product obtained by the method of the present invention was 6.8 times as low as the cost of the end product obtained in accordance with the production procedure described in USSR Inventor's Certificate No. 401,685.

The suspension of a filler for rubber mixtures, produced in accordance with the present invention was introduced into the composition of a vulcanizate based on synthetic butadiene-styrene rubber containing 30 parts by mass of styrene in 100 parts by mass of a polymer.

The composition of the vulcanized rubber containing the suspension of a filler was as follows, in % by mass:
 rubber—100.0
 sulphur—1.0
 di-(2benzthiasolyl)-disulphide—1.25
 zinc oxide—2.0
 softener—10.0
 suspension of a filler—71.0

The softener had the following physical and chemical characteristics:
 density at a temperature of 20° C., g/cm$^3$—0.9674
 index of refraction—1.5895
 Engler viscosity at a temperature of 50° C., Engler grades—11.4
 molecular mass—358
 fractional composition, °C.
  beginning of boiling—348
  50% boiled away—385
  end of boiling—496
 content of sulphur, % by mass—1.92
 group chemical composition, % by mass:
  methano-naphtenic hydrocarbons—11.9
  monocyclic aromatic hydrocarbons—11.2
  bicyclic aromatic hydrocarbons—30.4
  polycyclic aromatic hydrocarbons—40.4
  resins—6.4

The above vulcanizate was subjected to testing simultaneously with a conventional vulcanizate of the following composition in % by mass of:
 rubber—100.0
 sulphur—2.0
 di-(2-benzthiasolyl)-disulphide—2.75
 stearic acid—0.5
 zinc oxide—5.0
 carbon black—40.0
 softener—37.5

The conventional vulcanizates contained a carbon black and a softener which had the characteristics described above. The test results were as follows:
 tensile strength at a temperature of 20° C., kg/cm$^2$:
  vulcanizate with the suspension of a filler—286
  conventional vulcanizate—272
 relative elongation at a temperature of 20° C.:
  vulcanizate with the suspension of a filler—851
  conventional vulcanizate—834
 permanent elongation, %:
  vulcanisate with the suspension of a filler—12
  conventional vulcanizate—16 tear resistance, kgf/cm:
  vulcanizate with the suspension of a filler—46
  conventional vulcanizate—45
cracking resistance, thousands of cycles: vulcanizate with the suspension of
  a filler—28
  conventional vulcanizate—26
abrasion, cm/kWh;
  vulcanizate with the suspension of the filler—263
  conventional vulcanizate—275

So, when using thus prepared suspensions of a filler for rubber mixtures in the composition of a vulcanizate, the latter possesses higher physical and mechanical properties as compared to those of conventional vulcanizates.

The tear resistance of samples was determined in the following way.

For testing purposes, there were used flat samples with incisions in the centre of the inner side which were made at a right angle with respect to the surface of the sample. The samples were chopped out from 2 mm thick plates. A sample prepared for testing was secured in the clamps of a breaking machine and streched at a speed of 8.3 mm/sec, the load corresponding to the complete breaking of the sample being noted.

The value B of the tear resistance was determined by the following formula:

$$B = (P_p/h_o) \text{ (kgf/cm)}$$

where $P_p$ is maximum streching force, kgf;
$h_o$ is initial thickness of the sample, cm.

The procedure of testing the obtained and conventional vulcanizates to determine the cracking resistance thereof under bending with a local concentration of stress was the following.

For testing purposes, there were used flat zigzag transverse M-shaped groves. The samples were clamped at a distance of 0.5 to 1.0 mm from one another in a parallel relationship so that the brinks of the transverse groves in the samples coincided. The direction of the bend of the samples was perpendicular to the longitudinal axis thereof.

After securing the samples, the latter were bent at a frequency of 250 cycles per minute. When cracks appeared, the time and location of cracking was noted.

At certain intervals of time after cracking occurred, there were determined the size of the crack which acquired the shape of ellipse under bending.

The testing was over when the total area of all the cracks on the sample exceeded 50 mm².

The number N of cycles of deformation from the beginning of the testing till the area of deformation of 50 mm² was calculated by the following formula:

$$N = Y \cdot \tau$$

where

Y is frequency of deformation, cycle/min;
$\tau$ is duration of testing, min.

The procedure of testing the samples of the obtained and conventional vulcanizates pressed against an abrasive surface of a disc rotating at a constant speed under the conditions of slipping and a constant friction force was the following.

The samples to be tested were right parallelepipeds with a surface to be abraded having the form of a square with a side of 20.0 mm. The surface of the samples was free of such flaws as pores, cavities cracks and others. The material used for abrading the samples was a grinding cloth secured on the disc of the device, and the samples were secured in holders. The pressing force was equal to 0.325 kgf/cm². The friction force was continuously noted in the course of the testing process which was ended after 200 rotations of the disc.

The results of the testing were expressed by the value $\alpha$ of abrasion in cm³/kWh which is a ratio between a decrease in the volume of the vulcanizate $\Delta V$ in cm³ and the work lost in friction A, in kWh, $\alpha = \Delta V / \Delta$.

EXAMPLE 2

The method of the present invention was carried out substantially as described in Example 1, with the difference that 1 part by mass of polymeric materials was mixed with 10 parts by mass of a hydrocarbonaceous solvent which was a petroleum fraction having a boiling temperature of 25° to 200° C. and having the following physical and chemical properties:

density at a temperature of 20° C., g/cm³—0.7058
kinematic viscosity at a temperature of 50° C., cSt—0.5
sulphur content, parts by mass—0.03
group chemical composition, % by mass:
  paraffino-naphthenic hydrocarbons—70.8
  monocyclic aromatic hydrocarbons—19.2
  bicyclic aromatic hydrocarbons—7.4
  polycyclic aromatic hydrocarbons—2.6

The obtained mixture was isothermally heated at a temperature of 291° C. and at a pressure of 12·10⁵ N/m² for 5·5 hours. Low-boiling fractions were distilled from the formed suspension in the presence of nitrogen being continuously fed at a rate of 0.01 l/hr per 1 kg of the suspension. The distillation process was carried out at a temperature of 50° C. and at a pressure of 1.2·10² N/m².

The obtained suspension of a filler for the rubber mixtures was of the following physical and chemical properties:

density at a temperature of 20° C., g/cm²—1.4295
Engler viscosity at a temperature of 100° C., Engler grades—118.4 content in % by mass:
  of highly dispersed silicon oxide—54.6
  of hydrocarbons—32.4
  of zinc oxide—4.8
  of active substances—3.9
  of stearic acid—1.8
  of sulphur and its compounds—2.5

The cost of the end product was 8 times as low as the cost of the product obtained in accordance with the production procedure described in USSR Inventor's Certificate No. 401,685.

The obtained suspension of a filler for rubber mixtures was introduced into the composition of a vulcanizate based on synthetic butadiene-styrene rubber containing 30 parts by mass of styrene in 100 parts by mass of a polymer.

The composition of the vulcanizate containing the suspension of a filler was the following, in % by mass:
rubber—100
sulfur—1.0
di-(2-benzthiasolyl)-disulphide—1.25
zinc oxide—2.0
softener—10.0
suspension of a filler—71.0

The above vulcanizate was subjected to testing simultaneously with a conventional vulcanizate having the following composition in % by mass:
rubber—100.0
sulphur—2.0
di-(2-benzthiasolyl)-disulphide—2.75
stearic acid—0,5
zinc oxide—5.0
highly dispersed silicon oxide—40.0
softener—37.5
The test results were the following:
tensile strength at a temperature of 20° C., kg/cm$^2$
   vulcanizate with the suspension of a filler—275
   conventional vulcanizate—259
relative elongation at a temperature of 20° C.,%:
   vulcanizate with the suspension of a filler—838
   conventional vulcanizate—805
permanent elongation, %:
   vulcanizate with the suspension of a filler—13
   conventional vulcanizate—18
tear resistance, kgf/cm:
   vulcanizate with the suspension of a filler—45
   conventional vulcanizate—43
cracking resistance, thousands of cycles:
   vulcanizate with the suspension of a filler—27
   conventional vulcanizate—24
abrasion, cm$^3$/kWh:
   vulcanizate with the suspension of a filler—629
   conventional vulcanizate—281

EXAMPLE 3

The method of the present invention was carried out substantially as described in Example 1, with the difference that 1 part by mass of polymeric materials was mixed with 0.5 part by mass of a hydrocarbonaceous solvent which was a petroleum residue having a softening temperature according to the ring and ball method of 28° C. and characterized by the following physical and chemical properties:
   density at a temperature of 20° C., g/cm$^3$—0.9820
   Engler viscosity at a temperature of 100° C., Engler grades—20.8
   content of sulphur, % by mass—2.9
   group chemical composition, % by mass:
     paraffino-naphthenic hydrocarbons—21.6
     monocyclic aromatic hydrocarbons—11.9
     bicyclic aromatic hydrocarbons—11.5
     polycyclic aromatic hydrocarbons—17.3
     resins—29.6

The obtained mixture was isothermally heated at a temperature of 280° C. and at a pressure of 5·10$^4$ N/m$^2$ for 2 hours. Low-boiling fractions were distilled from the formed suspension in the presence of nitrogen being uninterruptedly fed at a rate of 8 l/hr per 1 kg of the suspension. The distillation process was carried out at a temperature of 400° C. and at a pressure of 1·10$^3$ N/m$^2$.

The obtained suspension of a filler for rubber mixtures was of the following physical and chemical properties:
   density at a temperature of 20° C., g/cm$^3$ 1.2149
   Engler viscosity at a temperature of 100° C., Engler grades—40.2
   content in % by mass:
     of carbon black—20.2
     of hydrocarbons—75.6
     of zinc oxide—1.0
     of active substances—1.2
     of stearic acid—0.9
     of sulphur and its compounds—1.1

The cost of the end product was 6.1 times lower from the cost of the product obtained in accordance with the procedure outlined in USSR Inventor's Certificate No. 401,685.

EXAMPLE 4

The method of the present invention was carried out substantially as described in Example 1, with the difference that 1 part by mass of polymeric materials (in this instance, waste products of vulcanized rubber materials based on butadiene rubber) was mixed with 60 parts by mass of a hydrocarbonaceous solvent. Used as the hydrocarbonaceous solvent in this case were petroleum fractions described in Example 1.

The obtained mixture was isothermally heated substantially as described in Example 1 but at a pressure of 5·10$^5$ N/m$^2$. Thereafter, low-boiling fractions were distilled from the formed suspension in the presence of nitrogen being continuously fed at a rate of 0.01 l/hr per 1 kg of the suspension. The distillation process was carried out at a temperature of 160° C. and at a pressure of 2·10$^3$ n/m$^2$.

The obtained suspension of a filler for rubber mixtures was of the following physical and chemical properties:
   density at a temperature of 20° C., g/cm$^3$ 1.3212
   Engler viscosity at a temperature of 100° C., Engler grades—81.4
   content in % by mass:
     of carbon black—40.0
     of hydrocarbons—52.3
     of zinc oxide—2.0
     of active substances—2.8
     of stearic acid—1.4
     of sulphur and its compounds—1.5

The cost of the obtained product was 6.5 times lower than that of the product produced in accordance with the production procedure outlined in USSR Inventor's Certificate No. 401,685.

EXAMPLE 5

The method of the present invention was carried out substantially as described in Example 1, with the difference that 1 part by mass of polymeric materials (in this instance, waste products of vulcanized rubber materials based on isoprene rubber) was mixed with 10 parts by mass of a hydrocarbonaceous solvent. Used as the hydrocarbonaceous solvent in this case were petroleum fractions having a boiling temperature of 350° to 450° C. and being of the following physical and chemical properties:
   density at a temperature of 20° C., g/cm$^3$—0.989
   Engler viscosity at a temperature of 100° C., Engler grades—12.1
   content of sulphur, % by mass—2.3
   group chemical composition, % by mass:
     paraffino-naphthenic hydrocarbons—20.7
     monocyclic aromatic hydrocarbons—9.5
     bicyclic aromatic hydrocarbons—8.9
     polycyclic aromatic hydrocarbons—11.1
     resins—22.7
     asphaltenes—27.1

The obtained mixture was isothermally heated at a temperature of 300° C. and at a pressure of 1·10$^5$ N/m$^2$ for 1 hour. Low-boiling fractions were distilled from the formed suspension in the presence of nitrogen being continuously fed at a rate of 0.07 l/hr per 1 kg of the suspension. The distillation process was carried out at a temperature of 250° C. and at a pressure of $1 \cdot 10^2$ N/m$^2$.

The obtained suspension of a filler for rubber mixtures was of the following physical and chemical properties:

density at a temperature of 20° C., g/cm$^3$—1.3011
Engler viscosity at a temperature of 100° C., Engler grades—76.5
content in % by mass:
  of carbon black—34.2
  of hydrocarbons—59.2
  of zinc oxide—1.6
  of active substances—1.5
  of stearic acid—1.3
  of sulphur and its compounds—1.2

The cost of the end product was 6.7 times lower than that of the product obtained in accordance with the production procedure outlined in USSR Inventor's Certificate No. 401,685.

EXAMPLE 6

The method of the present invention was carried out substantially as described in Example 1, with the difference that 1 part by mass of waste products of vulcanized rubber materials based on butadiene rubber was mixed with 5 parts by mass of a hydrocarbonaceous solvent. Used as the hydrocarbonaceous solvent in this case were low-boiling fractions obtained as a result of distillation process from the products of a thermal decomposition in the course of carrying out the method of the present invention and having the following physical and chemical properties:

density at a temperature of 20° C., g/cm$^3$—0.932
kinematic viscosity at a temperature of 50° C., cSt—12.3
content of sulphur, % by mass—0.9
group chemical composition, % by mass:
  paraffino-naphtenic hydrocarbons—58.2
  monocyclic aromatic hydrocarbons—25.6
  bicyclic aromatic hydrocarbons. 9.2
  polycyclic aromatic hydrocarbons 6.4 resins—0.6

The obtained mixture was isothermally heated at a temperature of 280° C. and under a pressure of $1 \cdot 10^5$ N/m$^2$ for 2.4 hours. Low-boiling fractions were distilled from the formed suspension in the presence of nitrogen being continuously fed at a rate of 8.0 l/hr per 1 kg of the suspension. The distillation process was carried out at a temperature of 350° C. and at a pressure of $1 \cdot 10^5$ N/m$^2$.

The obtained suspension of a filler for rubber mixtures was of the following physical and chemical properties:

density at a temperature of 20° C., g/cm$^3$—1.3967
Engler viscosity at a temperature of 100° C., Engler grades—98.6
content in % by mass:
  of carbon black—51.8
  of hydrocarbons—38.2
  of zinc oxide—4.0
  of active substances—3.1
  of stearic acid—1.4
  of sulphur and its compounds—1.5

The cost of the end product was 7.8 times lower than that of the product obtained in accordance with the production procedure outlined in USSR Inventor's Certificate No. 401,685.

EXAMPLE 7

The method of the present invention was carried out substantially as described in Example 1, with the difference that 1 part by mass of polymeric materials (in this instance, waste products of vulcanized rubber materials based on butadiene-nitrile rubber) was mixed with 2 parts by mass of a hydrocarbonaceous solvent. Used as the hydrocarbonaceous solvent in this case were petroleum fractions having a boiling temperature of 450° to 600° C. and possessing the following physical and chemical properties:

density at a temperature of 20° C., g/cm$^3$—0.911
kinematic viscosity at a temperature of 50° C., cSt—6.3
content of sulphur, % by mass—0.1
group chemical composition, % by mass:
  paraffino-naphtenic hydrocarbons—67.0
  monocyclic aromatic hydrocarbons—19.0
  bicyclic aromatic hydrocarbons—8.0
  polycyclic aromatic hydrocarbons—4.0
  resins—2.1

The obtained mixture was isothermally heated at a temperature of 330° C. and at a pressure of $2 \cdot 10^3$ N/m$^2$ for 1.5 hour. Low-boiling fractions were distilled from the formed suspension in the presence of nitrogen being continuously fed at a rate of 0.5 l/hr per 1 kg of the suspension. The distillation process was carried out at a temperature of 230° C. and at a pressure of $4 \cdot 10^2$ N/m$^2$.

The obtained suspension of a filler for rubber mixtures was of the following physical and chemical properties:

density at a temperature of 20° C., g/cm$^3$—1.1248
Engler viscosity at a temperature of 100° C., Engler grades—26.8
content in % by mass:
  of carbon black—14.8
  of hydrocarbons—82.9
  of zinc oxide—0.4
  of active substances—1.0
  of stearic acid—0.8
  of sulphur and its compounds. 0.8

The cost of the end product was 6.1 times lower than that of the product obtained in accordance with the production procedure outlined in USSR Inventor's Certificate No. 401,685.

EXAMPLE 8

The method of the present invention was carried out substantially as described in Example 7, with the difference that the polymer materials were mixed with the hydrocarbonaceous solvent in a ratio of 1:1 in parts by mass.

The obtained mixture was isothermally heated at a temperature of 370° C. and at a pressure of $1.4 \cdot 10^5$ N/m$^2$ for 0.5 hour. Low-boiling fractions were distilled from the formed suspension in the presence of steam being continuously fed at a rate of 2.0 l/hr per 1 kg of the suspension. The distillation process was carried out at a temperature of 280° C. and at a pressure of $7 \cdot 10^2$ N/m$^2$.

The obtained suspension of a filler for rubber mixtures was of the following physical and chemical properties:

density at a temperature of 20° C., g/cm$^3$—1.2327
Engler viscosity at a temperature of 100° C., Engler grades—43.4
content in % by mass:

of carbon black—25.4
of hydrocarbons—69.5
of zinc oxide—1.2
of active substances—1.5
of stearic acid—1.1 of sulphur and its compounds—1.3

The cost of the end product was 6.5 times lower than that of the product obtained in accordance with the production procedure outlined in USSR Inventor's Certificate No. 401,685.

EXAMPLE 9

The method of the present invention was carried out substantially as described in Example 1, with the difference that the polymeric materials described in Example 7 were mixed with the hydrocarbonaceous solvent in a ratio of 1:0.5 parts by mass. The hydrocarbonaceous solvent was a mixture of the petroleum fraction described in Example 7 with the suspension of a filler, obtained by the proposed method. Said hydrocarbonaceous solvent possessed the following physical and chemical properties:
  density at a temperature of 20° C., g/cm$^3$—1.112
  Engler viscosity at a temperature of 100° C., Engler grades—23.6
  content of sulphur, % by mass—2.1
  group chemical composition, % by mass:
    paraffino-naphtenic hydrocarbons—47.2
    monocyclic aromatic hydrocarbons 15.2
    bicyclic aromatic hydrocarbons—12.3
    polycyclic aromatic hydrocarbons—9.8
    resins—3.4
    carbon black—12.1

The content of the suspension of a filler in the carbonaceous solvent amounted to 50% by mass.

The mixture of the polymeric materials with the hydrocarbonaceous solvent was isothermally heated at a temperature of 360° C. and at a pressure of $5 \cdot 10^4$ N/m$^2$ for 2.3 hours. Low-boiling fractions were distilled from the formed suspension in the presence of nitrogen being continuously fed at a rate of 0.3 l/hr per 1 kg of the suspension. The distillation process was carried out at a temperature of 300° C. and at a pressure of $1 \cdot 10^3$ N/m$^2$.

The obtained suspension of a filler for rubber mixtures was of the following physical and chemical properties:
  density at a temperature of 20° C., g/cm$^3$—1.2919
  Engler viscosity at a temperature of 100° C., Engler grades—53.5
  content in % by mass:
    of carbon black—30
    of hydrocarbons—62
    of zinc oxide—1.5
    of active substances—2.7
    of stearic acid—2.0
    sulphur and its compounds—1.8

The cost of the end product was 6.9 times lower than that of the product obtained in accordance with the production procedure outlined in USSR Inventor's Certificate No. 401,685.

EXAMPLE 10

The method of the present invention was carried out substantially as described in Example 1, with the difference that the polymeric materials described in Example 7 were mixed with the hydrocarbonaceous solvent in a ratio of 1:60 parts by mass. The carbonaceous solvent was a mixture of the petroleum fraction described in Example 3 with the suspension of a filler, produced according to the invention and having the following physical and chemical properties:
  density at a temperature of 20° C., g/cm$^3$—1.112
  Engler viscosity at a temperature of 100° C., Engler grades—23.6
  content of sulphur, % by mass—2.1
  group chemical composition, % by mass:
    paraffino-naphtenic hydrocarbons—47.2
    monocyclic aromatic hydrocarbons—15.2
    bicyclic aromatic hydrocarbons—12.3
    polycyclic aromatic hydrocarbons—9.8
    resins—3.4
    carbon black—12.1

The content of the suspension of a filler in the carbonaceous solvent was 99.5% by mass.

The mixture of the polymeric materials with the hydrocarbonaceous solvent was isothermally heated at a temperature of 300° C. and at a pressure of $2 \cdot 10^4$ N/m$^2$ for 1 hour. Low-boiling fractions were distilled from the formed suspension in the presence of steam being continuously fed at a rate of 1.0 l/hr per 1 kg of the suspension. The distillation process was carried out at a temperature of 340° C. and at a pressure of $2 \cdot 10^4$ N/m$^2$.

The obtained suspension of a filler for rubber mixtures was of the following physical and chemical properties:
  density at a temperature of 20° C., g/cm$^3$—1.3121
  Engler viscosity at a temperature of 100° C., Engler grades—78.2
  content in % by mass:
    of carbon black—37.0
    of hydrocarbons—57.0
    of zinc oxide—1.7
    of active substances—1.8
    of stearic acid—1.5
    of sulphur and its compounds—2.0

The cost of the end product was 7.1 times lower than that of the product obtained in accordance with the production procedure outlined in USSR Inventor's Certificate No. 401,685.

EXAMPLE 11

The method of the present invention was carried out substantially as described in Example 9, with the difference that the polymeric materials described in Example 4 and the hydrocarbonaceous solvent were mixed in a ratio of 1:5 parts by mass. The hydrocarbonaceous solvent was a mixture of the low-boiling fractions described in Example 6 and the suspension of a filler, described in Example 9. The content of the suspension of a filler in the hydrocarbonaceous solvent was 10% by mass.

The obtained mixture of the polymeric materials with the hydrocarbonaceous solvent was isothermally heated at a temperature of 320° C. and at a pressure of $12 \cdot 10^5$ N/m$^2$ for 0.5 hour. Low-boiling fractions were distilled from the formed suspension in the presence of stack gases being continuously fed at a rate of 0.5 l/hr per 1 kg of the suspension. The distillation process was carried out at a temperature of 250° C. and at a pressure of $2 \cdot 10^3$ N/m$^2$.

The obtained suspension of a filler for rubber mixtures was of the following physical and chemical properties:
  density at a temperature of 20° C., g/cm$^3$—1.3893
  Engler viscosity at a temperature of 100° C., Engler grades—99.2 content in % by mass:
   of carbon black—51.0
   of hydrocarbons—40.0
   of zinc oxide—3.9
   of active substances—2.3
   of stearic acid—1.7
   of sulphur and its compounds. 1.1

The cost of the end product was 7.6 times lower than that of the product obtained in accordance with the production procedure outlined in USSR Inventor's Certificate No. 401,685.

EXAMPLE 12

The method of the present invention was carried out substantially as described in Example 1, with the difference that the polymeric materials described in Example 7 were mixed with the hydrocarbonaceous solvent in a ratio of 1:2 parts by mass. The hydrocarbonaceous solvent was a mixture of the petroleum fraction described in Example 3 and the suspension of a filler made according to the proposed method and having the following physical and chemical properties:
   density at a temperature of 20° C. g/cm$^3$ 1.112
   Engler viscosity at a temperature of 100° C., Engler grades—23.6
   content of sulphur, % by mass—2.1
   group chemical composition, % by mass:
      paraffino-naphtenic hydrocarbons—47.2
      monocyclic aromatic hydrocarbons—15.2
      bicyclic aromatic hydrocarbons—12.3
      polycyclic aromatic hydrocarbons—9.8
      resins—3.4 carbon black—12.1

The content of the suspension of a filler in the hydrocarbonaceous solvent was 80% by mass.

The mixture of the polymeric materials and the hydrocarbonaceous solvent was isothermally heated at a temperature of 340° C. and at a pressure of $1 \cdot 10^5$ N/m$^2$ for 5.2 hours. Low-boiling fractions were distilled from the formed suspension in the presence of steam being continuously fed at a rate of 8.0 l/hr per 1 kg of the suspension. The distillation process was carried out at a temperature of 400° C. and at a pressure of $1 \cdot 10^5$ N/m$^2$.

The obtained suspension of a filler for rubber mixtures was of the following physical and chemical properties:
   density at a temperature of 20° C., g/cm$^3$—1.3465
   Engler viscosity at a temperature of 100° C., Engler grades—82.3
   content in % by mass:
      of carbon black—41.0
      of hydrocarbons—51.0
      of zinc oxide—2.1
      of active substances—2.9
      of stearic acid—1.7
      of sulphur and its compounds—1.3

The cost of the end product was 7.2 times lower than that of the product obtained in accordance with the production procedure outlined in USSR Inventor's Certificate No. 401,685.

EXAMPLE 13

The method of the present invention was carried out substantially as described in Example 9, with the difference that the polymeric materials described in Example 1 and the hydrocarbonaceous solvent were mixed in a ratio of 1:1 parts by mass. The hydrocarbonaceous solvent was a mixture of a low-boiling fraction described in Example 5 with the suspension of a filler, described in Example 9. The content of the suspension of a filler in the hydrocarbonaceous solvent was 20% by mass.

The obtained mixture of the polymeric materials and the hydrocarbonaceous solvent was isothermally heated at a temperature of 280° C. and at a pressure of $2 \cdot 10^5$ N/m$^2$ for 5.5 hours. Low-boiling fractions were distilled from the formed suspension in the presence of carbon dioxide being continuously fed at a rate of 0.7 l/hr per 1 kg of the suspension. The distillation process was carried out at a temperature of 320° C. and at a pressure of $2.5 \cdot 10^3$ N/m$^2$.

The obtained suspension of a filler for rubber mixtures was of the following physical and chemical properties:
   density at a temperature of 20° C., g/cm$^3$ 1.3586
   Engler viscosity at a temperature of 100° C., Engler grades—91.6
   content in % by mass:
      of carbon black—44.0
      of hydrocarbons—48.0
      of zinc oxide—2.2
      of active substances—2.8
      of stearic acid—1.6
      of sulphur and its compounds—1.4

The cost of the end product was 7.5 times lower than that of the product obtained in accordance with the production procedure outlined in USSR Inventor's Certificate No. 401,685.

EXAMPLE 14 (NEGATIVE)

1 part by mass of the polymeric material described in Example 7 was mixed with 0.4 parts by mass of the hydrocarbonaceous solvent described in Example 6, which is lower than the lower limit indicated in the claims.

The obtained mixture was isothermally heated at a temperature of 250° C. and at a pressure of $5 \cdot 10^5$ N/m$^2$ for 6 hours. Low-boiling fractions were distilled from the formed suspension in the presence of nitrogen being continuously fed at a rate of 1.2 l/hr per 1 kg of the suspension. The distillation process was carried out at a temperature of 231° C. and a pressure of $8 \cdot 10^4$ N/m$^2$.

The obtained suspension of a filler for rubber mixtures was of the following physical and chemical properties:
   density at a temperature of 20° C., g/cm$^3$ 0.9875
   Engler viscosity at a temperature of 100° C., Engler grades—0.5
   content in % by mass:
      of carbon black—1.8
      of hydrocarbons—96.9
      of zinc oxide—0.2
      of active substances—0.15
      of stearic acid—0.15
      of sulphur and its compounds—0.8

In preparing the mixture of the polymeric materials with the hydrocarbonaceous solvent, the latter was taken in an insufficient amount. This resulted in that the thermal decomposition was incomplete, which was responsible for a low quality of the suspension of a filler.

EXAMPLE 15 (NEGATIVE)

1 part by mass of the polymeric material described in Example 5 was mixed with 65 parts by mass of the hydrocarbonaceous solvent described in Example 3, which exceeds the maximum limit indicated in the claims.

The obtained mixture was isothermally heated at a temperature of 280° C. and at a pressure of $5\cdot10^4$ N/m$^2$ for 2 hours. Low-boiling fractions were distilled from the formed suspension in the presence of nitrogen being continuously fed at a rate of 0.001 l/hr per 1 kg of the suspension, which was less than the minimum level indicated in the claims. The distillation process was carried out at a temperature of 400° C. and at a pressure of $2\cdot10^3$ N/m$^2$.

The obtained suspension of a filler for rubber mixtures was of the following physical and chemical properties:
density at a temperature of 20° C., g/cm$^3$ 1.0281
Engler viscosity at a temperature of 100° C., Engler degrees—29.4
content in % by mass:
of carbon black—1.2
of hydrocarbons—95.84
of zinc oxide—0.07
of active substances—0.06
of stearic acid—0.03
of sulphur and its compounds—2.8

In the preparation of the mixture of the polymeric materials with the hydrocarbonaceous solvent, the latter was taken in an excessive amount, and in the course of the distillation process nitrogen was fed at a very low rate. This resulted in incomplete removal of the hydrocarbonaceous solvent and hence in a deterioration of the quality of the suspension of a filler.

EXAMPLE 16 (NEGATIVE)

1 part by mass of the polymeric material described in Example 1 was mixed with 10 parts by mass of the hydrocarbonaceous solvent described in Example 5.

The obtained mixture was isothermally heated at a temperature of 300° C. and at a pressure of $1\cdot10^5$ N/m$^2$ for 1 hour. Low-boiling fractions were distilled from the formed suspension in the presence of steam being continuously fed at a rate of 1.0 l/hr per 1 kg of the suspension. The distillation process was carried out at a temperature of 410° C. which exceeds the maximum limit indicated in the claims and at a pressure of $1\cdot10^3$ N/m$^2$.

In this case, solid coke-like products are formed in the obtained suspension of a filler. It is not advisable to use such a suspension of a filler in the composition of vulcanizates, since the physical and mechanical properties of the latter will be greately impared.

EXAMPLE 17 (NEGATIVE)

1 part by mass of the polymeric material described in Example 4 was mixed with 5 parts by mass of the hydrocarbonaceous solvent described in Example 6.

The obtained mixture was isothermally heated at a temperature of 280° C. and at a pressure of $1\cdot10^6$ N/m$^2$ for 2.4 hours. Low-boiling fractions were distilled from the formed suspension in the presence of nitrogen being continuously fed at a rate of 4.2 l/hr per 1 kg of the suspension. The distillation process was carried out at a temperature of 350° C. and at a pressure of $0.5\cdot10^2$ N/m$^2$, which is lower, than the minimum limit indicated in the claims.

In this case, solid coke-like products are formed in the obtained suspension of a filler because of a substantially complete removal of hydrocarbons from the suspension of a filler.

The utilization of such a suspension of a filler is not advisable in the composition of vulcanizate.

EXAMPLE 18 (NEGATIVE)

1 part by mass of the polymeric material described in Example 2 was mixed with 10 parts by mass of the hydrocarbonaceous solvent described in Example 2.

The obtained mixture was isothermally heated at a temperature of 291° C. and at a pressure of $12\cdot10^5$ N/m$^2$ for 5.5 hours. Low-boiling fractions were distilled from the formed suspension in the presence of nitrogen being continuously fed at a rate of 0.01 l/hr per 1 kg of the suspension. The distillation process was carried out at a temperature of 40° C., which was lower than the minimum limit indicated in the claims, and at a pressure of $1.4\cdot10^3$ N/m$^2$.

Because the distillation process was carried out at a low temperature, the attempts to remove the low-boiling fractions from the suspension of a filler failed. This resulted in a low quality of the obtained suspension of a filler, which is not suitable for utilization in the composition of vulcanizates.

EXAMPLE 19 (NEGATIVE)

1 part by mass of the polymeric material described in Example 7 was mixed with 1 part by mass of the hydrocarbonaceous solvent described in Example 5.

The obtained mixture was isothermally heated at a temperature of 370° C. and at a pressure of $1.4\cdot10^5$ N/m$^2$ for 0.5 hour. Low-boiling fractions were distilled from the formed suspension in the presence of nitrogen continuously fed at a rate of 8.5 l/hr per 1 kg of the suspension, which exceeds the maximum limit indicated in the claims.

The distillation process was carried out at a temperature of 400° C. and at a pressure of $5\cdot10^3$ N/m$^2$.

In the course of the distillation of low-boiling fractions, the filler is carried away in a considerable quantity by the stream of nitrogen, which adversely affects the quality of the filler.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

We claim:
1. A method of making a suspension of a filler for rubber mixtures in a hydrocarbonaceous solvent, comprising the steps of:
    (a) mixing polymeric materials containing a filler with a hydrocarbonaceous solvent in a ratio of 1:05 to 1:60 parts by mass;
    (b) heating the obtained mixture under such pressure as to prevent volatilization of any component thereof at a temperature sufficient to bring about thermal decomposition of the polymeric materials and for formation of a suspension;
    (c) distilling low-boiling fractions from the suspension formed as a result of the thermal decomposition in the presence of an inert gaseous agent at a temperature of 50° to 400° C. and at a pressure of $1.10^2$ to $1.10^5$ N/m$^2$.

2. A method as claimed in claim 1, wherein the hydrocarbonaceous solvent is liquid hydrocarbon selected from the group consisting of petroleum fractions having a boiling temperature of from 25° to 600° C.; petroleum residues having a softening temperature by the ring and ball method of from 5° to 150° C.; low-boiling fractions obtained as a result of said distillation from the products of the thermal decomposition; mixtures of said petroleum fractions with the suspension of a filler; mixtures of said low-boiling fractions with the suspension of a filler.

3. A method as claimed in claim 1, wherein the inert gaseous agent used in the distillation process is steam, nitrogen, carbon dioxide and/or mixtures thereof.

4. A method as claimed in claim 1, wherein the inert gaseous agent used in the distillation process is continuously fed at a rate of from 0.01 to 8 l/hr per 1 kg of the suspension.

5. A method as claimed in claims 1, 2, 3 or 4 wherein said heating of the mixture is effected at from 250° to 370° C. at a pressure of $2.10^3$ to $12.10^5$ N/m².

* * * * *